No. 666,905. Patented Jan. 29, 1901.
G. W. PACKER.
AUTOMATIC SHEARING AND MILLING MACHINE.
(Application filed Mar. 30, 1900.)
(No Model.) 5 Sheets—Sheet 1.

WITNESSES:
Howard A. Redfield,
W<sup>m</sup> A. Dreffein.

INVENTOR:
George W. Packer

No. 666,905. Patented Jan. 29, 1901.
G. W. PACKER.
AUTOMATIC SHEARING AND MILLING MACHINE.
(Application filed Mar. 30, 1900.)
(No Model.) 5 Sheets—Sheet 3.

WITNESSES: Howard A. Redfield, Wm. A. Dreffein.

INVENTOR: George W. Packer

No. 666,905. Patented Jan. 29, 1901.
G. W. PACKER.
AUTOMATIC SHEARING AND MILLING MACHINE.
(Application filed Mar. 30, 1900.)

(No Model.) 5 Sheets—Sheet 4.

WITNESSES:
Howard A. Redfield
Wm. A. Dreffein

INVENTOR:
George W. Packer

No. 666,905. Patented Jan. 29, 1901.
G. W. PACKER.
AUTOMATIC SHEARING AND MILLING MACHINE.
(Application filed Mar. 30, 1900.)
(No Model.) 5 Sheets—Sheet 5.

WITNESSES:
Howard A. Redfield
Wm. A. Dreffein

INVENTOR:
George W. Packer

UNITED STATES PATENT OFFICE.

GEORGE W. PACKER, OF CHICAGO, ILLINOIS.

AUTOMATIC SHEARING AND MILLING MACHINE.

SPECIFICATION forming part of Letters Patent No. 666,905, dated January 29, 1901.

Application filed March 30, 1900. Serial No. 10,825. (No model.)

*To all whom it may concern:*

Be it known that I, GEORGE W. PACKER, a citizen of the United States, residing at Chicago, in the county of Cook and State of Illinois, have invented certain new and useful Improvements in Automatic Shearing and Milling Machines; and I do hereby declare the following to be a full, clear, and exact description of the invention, such as will enable others skilled in the art to which it appertains to make and use the same.

The object of my invention is to provide a machine which shall automatically shear, punch, stamp, or perform similar operations upon the stock that is supplied to it and subsequently to automatically clamp and hold the product that it may be machined in the desired manner.

My machine, as herein described, is adapted to automatically shear rods of steel to the proper length for roller-bearings, such as are used in harvesting machinery, and finally to mill the end of said rollers round. It, however, can be very readily adjusted to do a variety of machine-work—such as drilling, turning, milling, threading, &c.—upon the stock.

Reference is to be had to the accompanying drawings, forming a part of this specification, in which drawings similar letters refer to similar parts through the several views.

Figure 1:
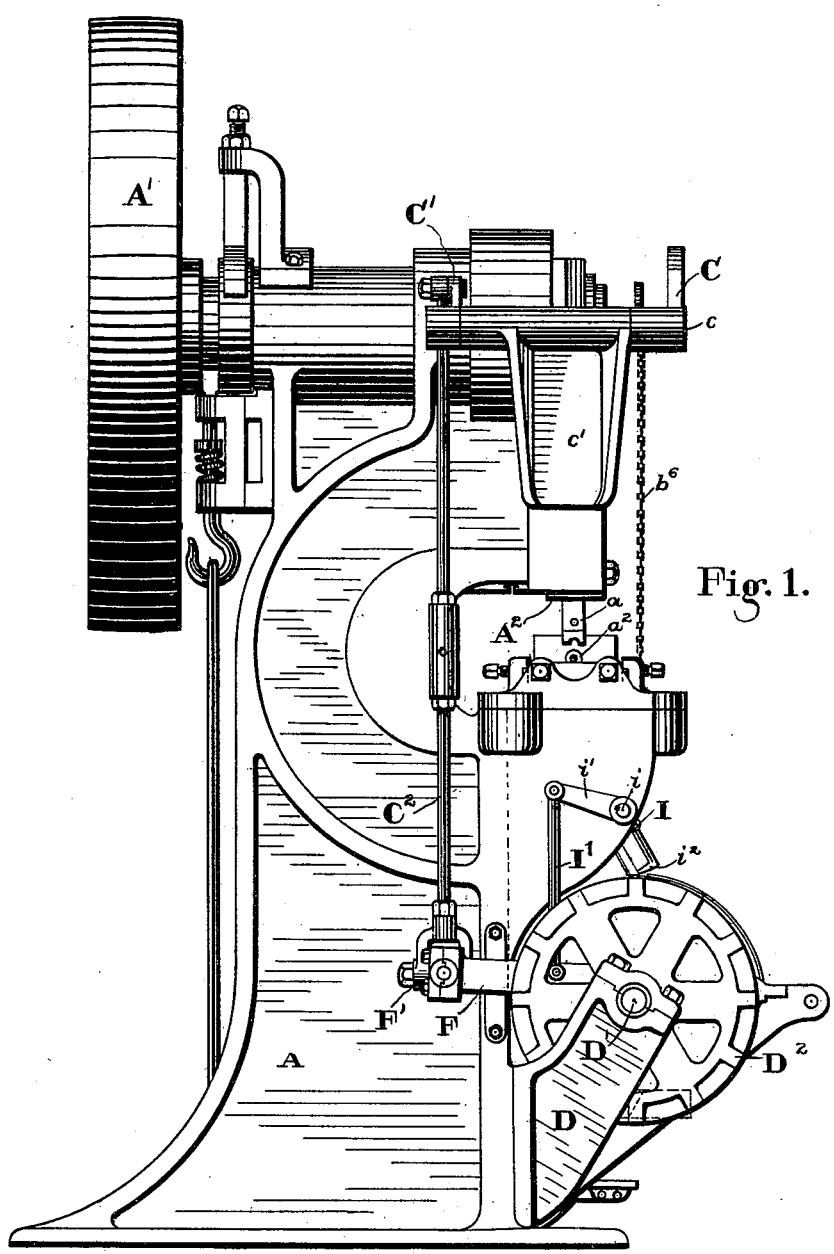
Figure 2:
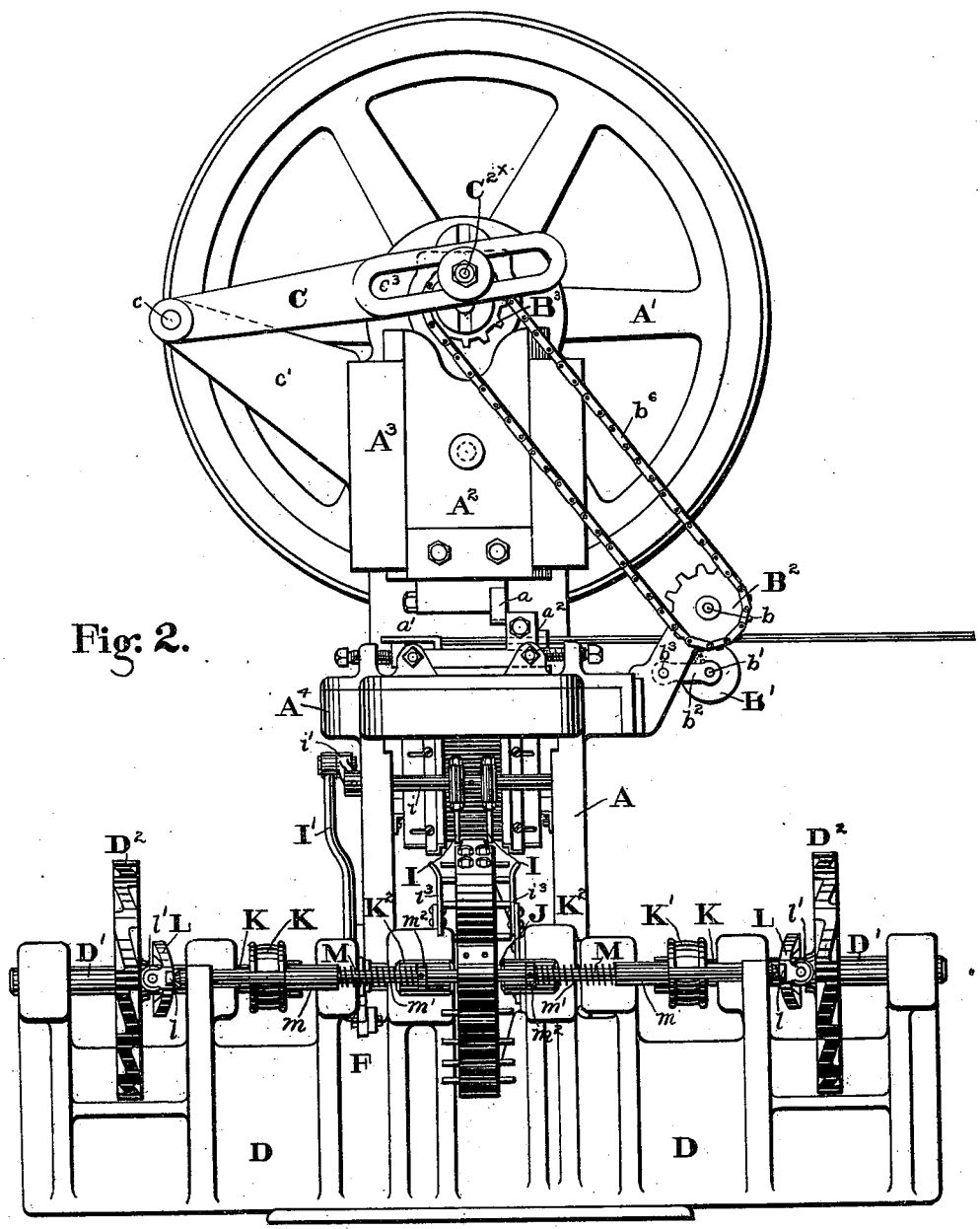
Figure 3:
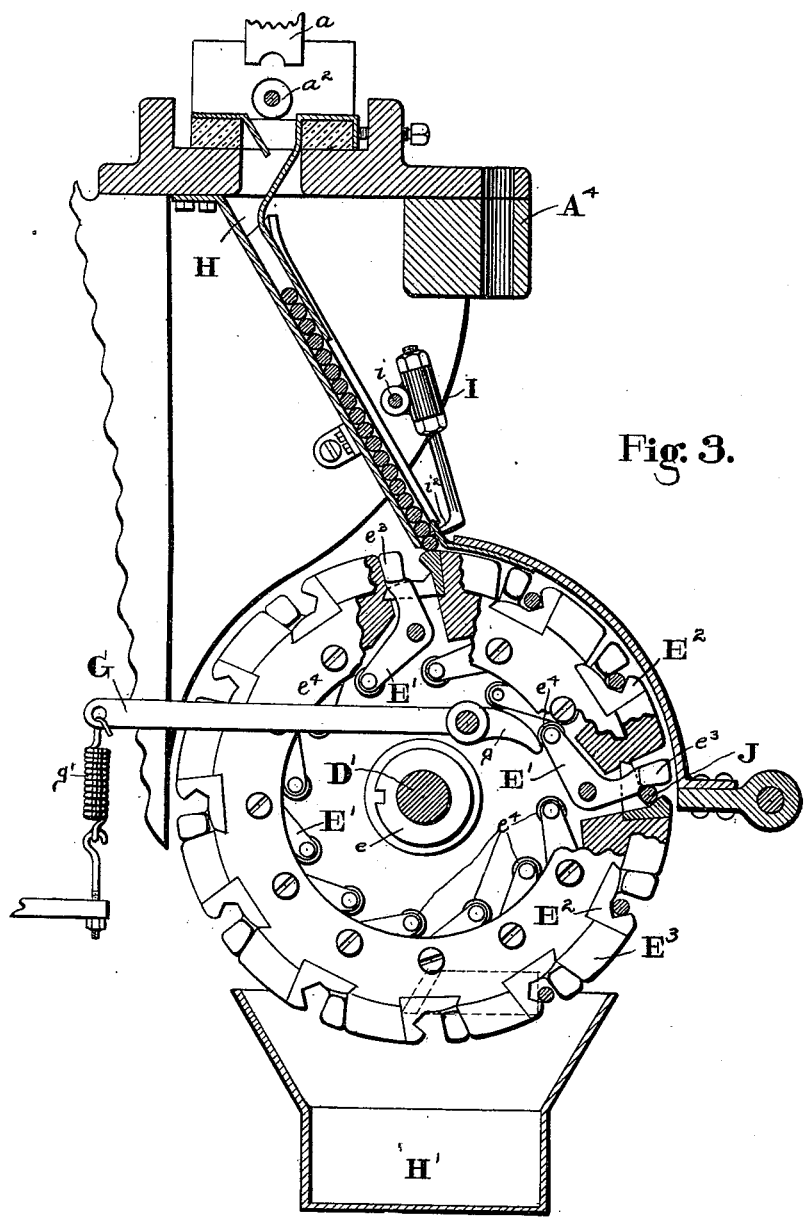
Figure 4:
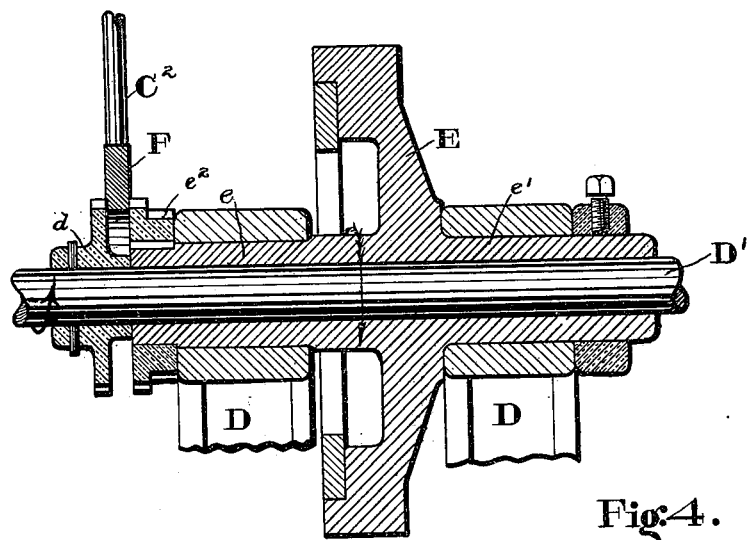
Figure 5:
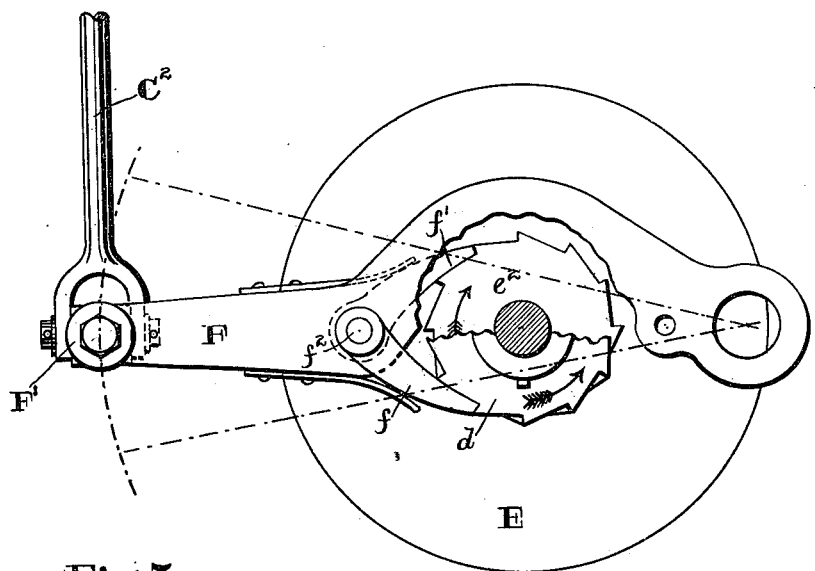
Figure 6:
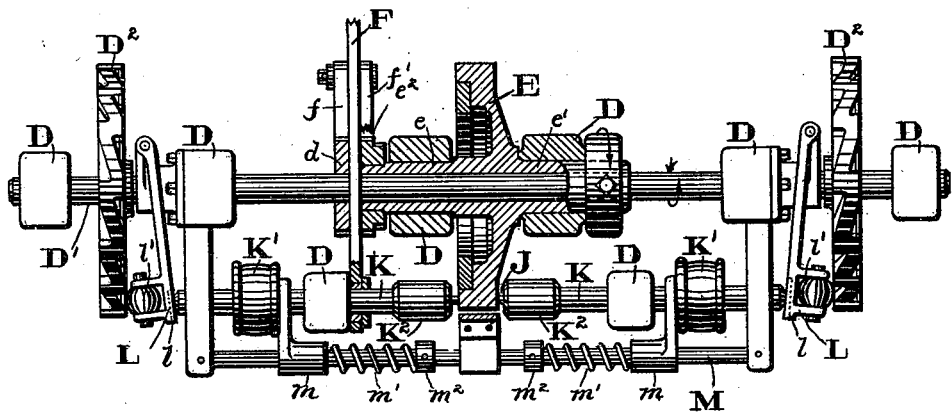
Figure 7:
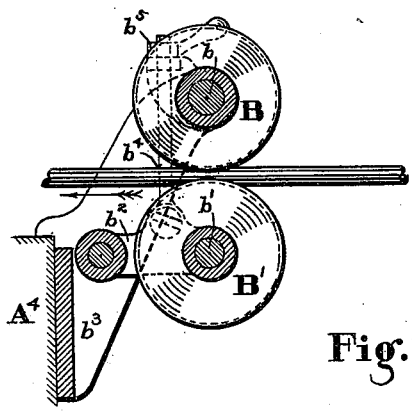
Figure 8:
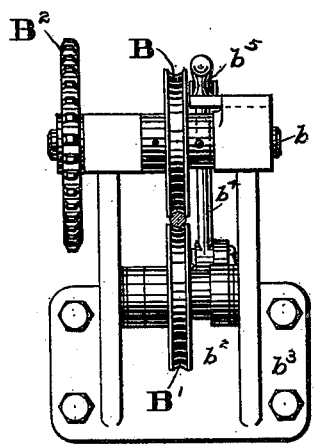

Figure 1 is a side elevation of my machine. Fig. 2 is a front elevation. Fig. 3 is a partial vertical sectional view of the shear, the hopper, and the revolving chucking device. Fig. 4 is a vertical sectional view showing the method of mounting the revolving clutch. Fig. 5 is a side elevation of the device for actuating the cam-wheels and the revolving chuck in opposite directions. Fig. 6 is a plan view, partly in section, of the mechanism for milling the ends of the rollers. Fig. 7 is a front elevation of the feeding-rollers. Fig. 8 is a side elevation of the feeding device.

The general framework corresponds with that of an ordinary shearing or punching machine.

In Figs. 1 and 2, A is the main frame, A' the fly-wheel, $A^2$ the shearing-head, $A^3$ the ways, and $A^4$ the bed, of the machine. Secured to the sides of the bed $A^4$, Figs. 2 and 7, is the bracket $b^3$, carrying the feeding-rollers B and B'. The feed-roller B and the sprocket-wheel $B^2$, Fig. 8, are secured to the shaft $b$, which is journaled in the bracket $b^3$. The feed-roller B' is revolubly mounted on shaft $b'$, which is secured in one end of the link $b^2$, the other end of which is suitably pivoted in the bracket $b^3$. The link $b^2$, and consequently the roller B', is held in the proper working position by means of the eyebolt $b^4$ and made adjustable by means of the wrench-nut $b^5$. The sprocket-wheel $B^3$, Fig. 2, is secured to the main shaft of the shearing-machine and is connected by means of the chain $b^6$ to the sprocket $B^2$, to which it imparts its motion, revolving in the direction indicated by the arrow. On the shearing-head $A^2$ is secured the shear $a$. On the bed $A^4$ are secured the die $a^2$ and the stop $a'$.

The operation of the feeding device is as follows: The stock is passed between the rollers B and B', which force it along by means of friction through the die $a^2$ until it strikes the stop $a'$, after which time the roller B slips on the stock. The shear $a$ then cuts off the rod, which upon being released is again forced through the die and the operation is repeated.

The shaft $c$, to which are rigidly secured the slotted lever C and the lever C', Figs. 1 and 2, is suitably journaled in the bracket $c'$, which is secured to the side of the way $A^3$. The slotted lever is operated by a crank formed on the end of the main shaft. The crank-pin $C^{2\times}$ slides in the slot $c^3$ in its revolution, descending when in the end of the slot farthest from the center of oscillation of the lever and ascending when in the end nearest the center. This gives the requisite variable movement to the lever, rising quickly and falling slowly, as will be hereinafter described.

Immediately in front and rigidly secured to the base of the machine is the framework D, Figs. 1, 2, 4, and 6, of the milling mechanism.

In suitable boxes in the frame D is mounted the shaft D', to which are secured the cam-wheels $D^2$ and the ratchet $d$, Figs. 4 and 6. Loosely mounted upon said shaft D' is the revolving chucking device. The main portion of said device consists of a large heavy wheel E, Figs. 3 and 4, having long hubs $e$ and $e'$, revolving in boxes of the main frame D. To the end of the hub $e$ is secured the ratchet $e^2$, Figs. 4 and 5. An actuating pawl-lever F is pivoted to the front of the main framework and placed between the ratchets $d$ and $e^2$, so that the pawls $f$ and $f'$, pivoted on opposite sides of the lever F by means of the pin $f^2$, may engage, respectively, with the ratchets $d$ and $e^2$. The lever F is connected with the lever C' by means of the connecting-rod $C^2$ and the universal joint F'. The operation of this actuating mechanism is as follows: The oscillation of the slotted lever C, due to the revolution of the crank on the main shaft to which it is attached, is imparted to the actuating pawl-lever F by means of the rock-shaft $c$, the lever C', the connecting-rod $C^2$, and the universal joint F'. As the lever F ascends the pawl $f'$ engages with the ratchet $e^2$ and revolves the chucking device, to which it is secured, from left to right, as shown by the arrow. As the lever F descends the pawl $f$ engages with the ratchet $d$ and revolves the ratchet, the shaft D', to which it is secured, and the cam-wheels $D^2$, which are also secured to the shaft D', in the opposite direction—from right to left—as indicated by the arrow. The pawl $f'$ then reengages the ratchet $e^2$ and the operation is repeated.

The chucking device, Fig. 3, consists of a heavy wheel E, having pivoted near its periphery a series of bell-cranks E', having one end of each hardened to form one of the jaws $e^3$ of the chucks and the other ends supplied with antifriction-rollers $e^4$. Inserted in the periphery of the wheel E is a series of hardened blocks $E^2$, forming the opposing jaws of the chucks. Pivoted in the main frame D is the lever G, having on one end the rounded portion $g$, which engages the antifriction-rollers $e^4$ of the bell-cranks E'. The other end of the lever G is connected to the main frame D by means of the spring $g'$, which supplies to the chucks a yielding uniform pressure.

Immediately above the chucking device and beneath the shear is the hopper H, which conducts the rollers sheared from the bars from the shear to the chucking device. In front of the hopper H, pivoted in the brackets which support the bed of the shear, are the automatic stops I, Figs. 1, 2, and 3. The stops I are operated by means of the rock-shaft $i$, the crank $i'$, and the connecting-rod I', which is pivoted to the actuating pawl-lever F.

The operation of the automatic stop and the chucking device is as follows: The column of rollers $h$ in the hopper H descends, so that the first roller rests upon the wheel E, when the actuating-lever F has descended to reëngage the ratchet $e^2$. When then the actuating-lever F ascends to turn the chucking device, its oscillating motion is imparted to the stops I, forcing their points $i^2$ between the first and second rollers, separating them, and upon revolution of the chucking device allows but one at a time to drop in the chuck. Here the roller lies, being properly guided into position by the guides $i^3$ until the chucking device has revolved a sufficient distance for the friction-roller $e^4$ of the bell-crank E' to engage the rounded portion of the lever G, when the jaw $e^3$ closes against the jaw $E^2$ and holds the roller firmly. The mechanism is so timed that the chucking device comes to rest, and the roller is held most firmly when it comes to the position at J. Here it is immediately operated upon by the milling-cutters, as will be hereinafter described. After being milled the antifriction-roller $e^4$ leaves the lever $g$, the bell-crank is released, and the chuck opens, leaving the roller free to drop out into the hopper H' below when the chucking device has revolved sufficiently far around.

Journaled in the main framework D are the milling-mandrels K, Figs. 2 and 6, one on either side of the chucking device, so that they are in line with the roller when it is firmly held in the chuck, as at J, Figs. 3 and 6. The pulleys K' are suitably secured to the mandrels K and belted in any convenient manner to driving-pulleys on a countershaft above. The mandrels K are also provided with chucks $K^2$, adapted to hold the cutter, such as are required to meet the demands of the work. At either end of the mandrels K, pivoted to the main frame D just in the rear of the shaft D', are the yoke-levers L. In the ends of the levers L opposite the mandrels are footstep-bearings $l$, adapted to slide in said levers to allow for their oscillation, which bearings receive the end thrust of the mandrels. Opposite the footstep-bearings $l$ are the antifriction-rollers $l'$, which are journaled in the yoke-levers L. These antifriction-rollers $l'$ roll on the successive cam-surfaces in the the cam-wheels $D^2$. Mounted also in the main frame D is the guide-rod M, upon which are placed the slides $m$ and the springs $m'$, which are made adjustable by the set-screw collars $m^2$. These springs serve simply to hold the mandrels back, so that the rollers shall always follow the cam-surfaces in the cam-wheel $D^2$. The operation of this portion of my machine is as follows: When the actuating-lever F ascends, it revolves the chucking device to a position where the roller to be operated upon is held firmly. This is accomplished by a quick upward movement, as above referred to, due to the shortness of the arm of the slotted lever C. The actuating-lever then immediately descends, revolves the cam-wheel $D^2$ in an opposite direction, and forces the revolving mandrels K in a proper distance to mill the ends of the rollers, since they are held in effective contact with the cam-surfaces. This is accomplished in as slow a manner as practical by the slow descent of the slotted lever C, due to its length, as above referred to, so that the cutters may have as much time as possible to do their work. Upon passing the highest point on the cam-surface the mandrels spring back, and the mechanism being so timed the cam-wheel $D^2$ ceases its revolution, the actuating-lever again ascends, revolving the chucking device, and the operation is repeated.

While in the preferred construction the clutch-wheel E and the cam-wheels $D^2$ $D^2$ are rotated in opposite directions, it is obvious that, if preferred, they may be rotated in the same direction, the changes necessary to adapt the machine to such operation being such as any skilled mechanic would make without difficulty.

It is obvious that in some cases the machining desired will require the action of but one mandrel. Hence I do not wish to be understood as limiting myself to a plurality of mandrels or their operating mechanism.

Having thus described my invention, what I claim, and desire to secure by Letters Patent, is—

1. A machine of the kind described, comprising a shearing device and mechanism for operating the same, a rotatable member provided with a plurality of clamps or chucks adapted to receive and firmly hold the blanks from said device, and mechanism for rotating said member and operating said clamps or chucks, in combination with oppositely-extending mandrels arranged in line with the clamped blanks, cam-wheels $D^2$ $D^2$ arranged to force the mandrels toward each other, means for returning the mandrels to their normal position, and mechanism for rotating said cam-wheels and also said mandrels, substantially as described.

2. A machine of the kind described, comprising a shearing device and mechanism for operating the same, a rotatable member provided with a plurality of clamps or chucks adapted to receive and firmly hold the blanks or articles, in combination with a reciprocating mandrel K carrying a chuck $K^2$, means for operating said mandrel, cam-wheels $D^2$ adapted to move said mandrel longitudinally as described, means for returning the mandrel to its normal position, and mechanism for alternately rotating the chuck member and the cams, substantially as described.

3. A machine of the kind described, comprising a shearing device and mechanism for operating the same, a rotatable member provided with a plurality of clamps or chucks adapted to receive and firmly hold the blanks, in combination with one or more reciprocating mandrels, means for operating said mandrels, cam-wheels $D^2$ $D^2$ adapted to move said mandrels longitudinally as described, means for returning the mandrels to their normal position, and mechanism for alternately rotating the chuck member and the cams, at different rates of speed, substantially as described.

4. A machine of the kind described, comprising a shearing device and mechanism for operating the same, the slotted lever C, the crank-pin $C^2$ located in the slot $c^3$ of said lever, in combination with a rotatable member provided with a plurality of clamps or chucks adapted to receive and firmly hold the blanks, one or more longitudinally-movable mandrels, means for rotating said mandrels, cam-wheels arranged to longitudinally move said mandrels, means for returning the mandrels to their normal position, and means for transmitting the reciprocating movement of the lever C to alternately rotate the chuck member and the cams, substantially as described.

5. A machine of the kind described, comprising a shearing device provided with a slotted lever C operated by a crank-pin $C^2$ located in said slot, in combination with a chuck member E provided with a plurality of clamps or chucks $E'$ $E^2$ adapted to receive and firmly hold the blanks or articles, cam-wheels $D^2$ $D^2$, longitudinally-movable mandrels arranged in line with the cams of said wheels $D^2$ $D^2$, and means for rotating said mandrels, spring mechanism arranged to normally hold the mandrels at their outer limit, the lever F, and the rod $C^2$ transmitting the reciprocating movement of the lever C to the lever F whereby said chuck and cam wheels are alternately rotated, substantially as described.

6. In a machine of the kind described, clamping mechanism consisting of the combination of the following elements; the wheel E, the blocks $E^2$ and bell-crank lever $E'$, in combination with the single resilient guide-lever G, having a spring connected thereto, and means for rotating said wheel, substantially as described.

7. In a machine of the kind described, a longitudinally-movable machining-mandrel, and means for driving said mandrel, in combination with a cam-wheel $D^2$, yoke-lever L intervened between the free end of the mandrel and the cam-wheel, means for rotating said cam-wheel, and means for resiliently holding said shaft K in contact with said lever and the latter in contact with the cam-wheel, substantially as described.

8. In a machine of the kind described, the shaft $D'$ having mounted thereon a ratchet-wheel $d$ and at one or both ends a cam-wheel $D^2$, in combination with the clamp or chuck wheel E provided with a ratchet-wheel $e^2$, the reciprocating lever F, provided with pawls engaging said ratchet-wheels and adapted upon reciprocating said lever to alternately rotate said shaft and said chuck-wheel, and means for transmitting the cam action of said wheel $D^2$ to a longitudinally-movable machining-shaft K, substantially as described.

9. In a shearing and milling machine, the combination of a shaft, a chuck, or clamp wheel for holding the material to be treated mounted thereon, a cam-wheel also mounted on said shaft, a mandrel adapted to act on the material held by the clamp-wheel, and means for moving the clamp-wheel and cam-wheel in opposite directions.

10. In a machine of the class described, the combination of a shaft, a chuck or clamp wheel for holding the material to be treated mounted on said shaft, a cam-wheel also mounted on said shaft, a mandrel adapted to act on the material held by the clamp-wheel, and means for turning the clamp-wheel rapidly in one direction, and for turning the cam-wheel slowly in the opposite direction.

GEORGE W. PACKER.

Witnesses:
 J. F. STEWARD,
 WM. A. DREFFEIN.